J. E. DITTEMORE.
HAND GARDEN PLOW.
APPLICATION FILED SEPT. 16, 1920.
1,425,372.
Patented Aug. 8, 1922.
2 SHEETS—SHEET 1.
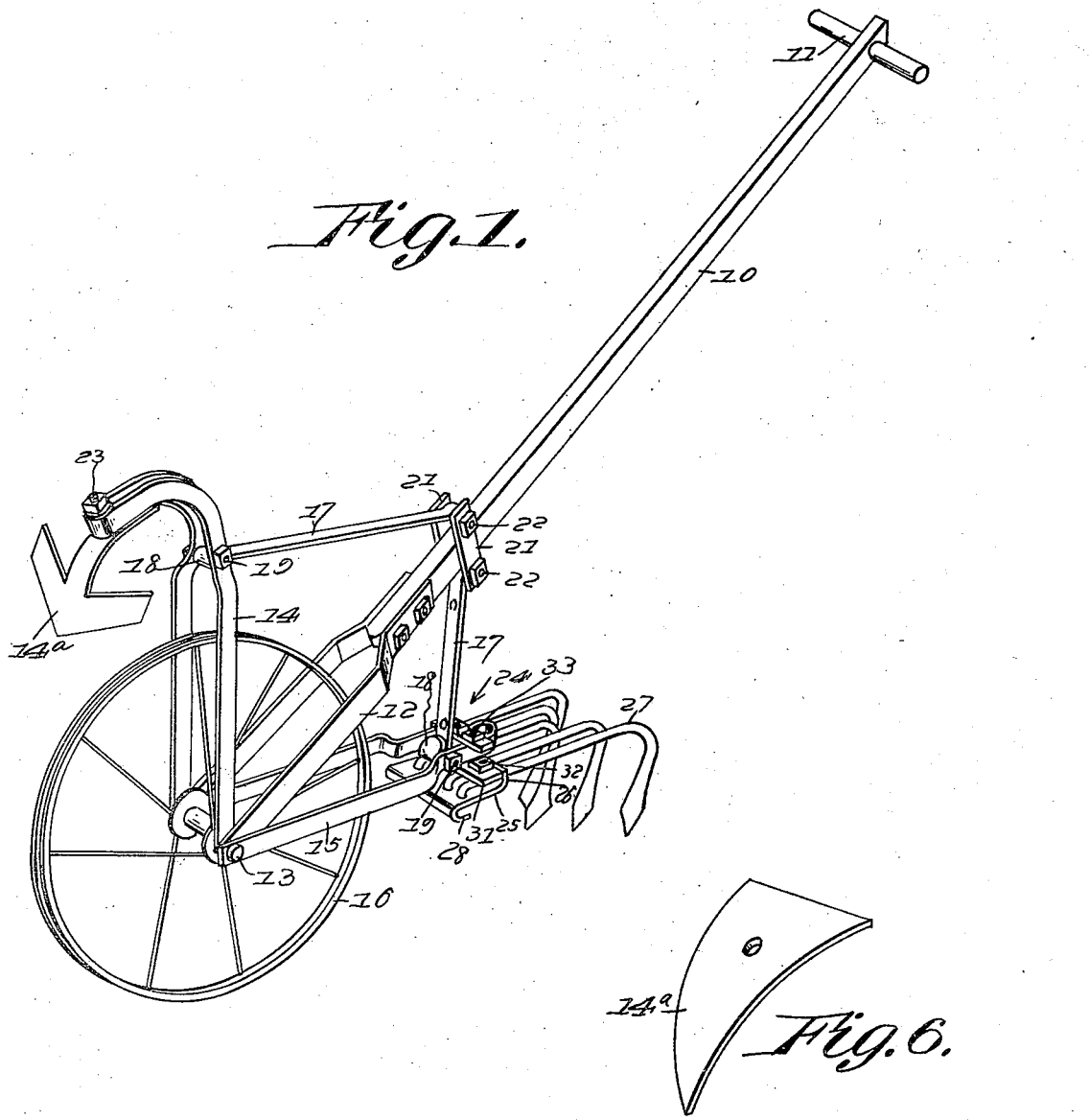

J. E. DITTEMORE.
HAND GARDEN PLOW.
APPLICATION FILED SEPT. 16, 1920.
1,425,372.
Patented Aug. 8, 1922.
2 SHEETS—SHEET 2.
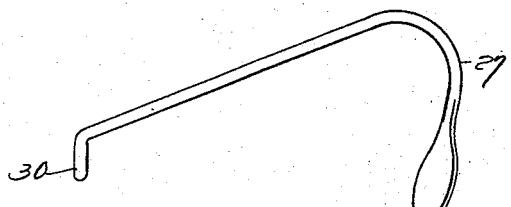
Fig. 5.
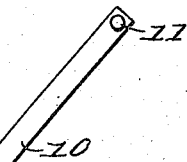
Fig. 2.
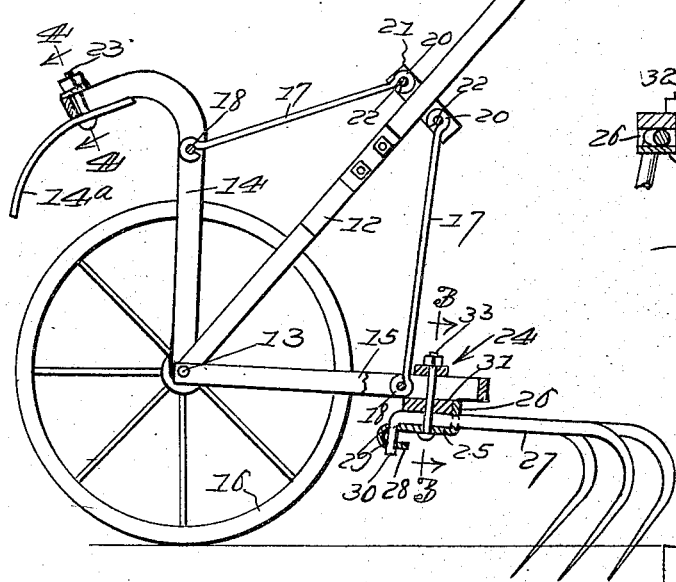
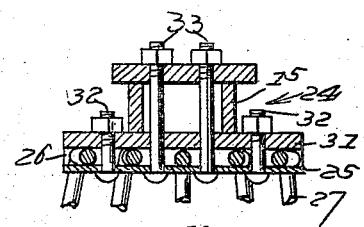
Fig. 3.
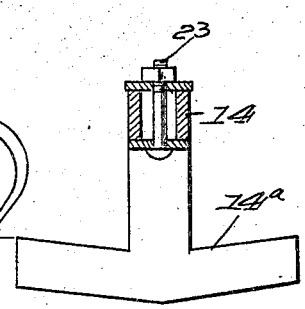
Fig. 4.
Inventor
J. E. Dittemore,
By G. Shum Talbert
Attorney

UNITED STATES PATENT OFFICE.

JOSEPH E. DITTEMORE, OF BLACKWELL, OKLAHOMA.

HAND GARDEN PLOW.

1,425,372.  Specification of Letters Patent.  Patented Aug. 8, 1922.

Application filed September 16, 1920. Serial No. 410,709.

*To all whom it may concern:*

Be it known that I, JOSEPH E. DITTEMORE, a citizen of the United States of America, residing at Blackwell, in the county of Kay and State of Oklahoma, have invented new and useful Improvements in Hand Garden Plows, of which the following is a specification.

The object of the invention is to provide a reversible garden plow adapted for interchangeable use as a weeder or plow and a cultivator, pulverizer or harrow by connecting with the staff or handle a frame adapted for simultaneously carrying a plurality of teeth and a cultivating head both of which are arranged in operative relation with a common supporting wheel to the end that either of said teeth or head may be brought into operative position by merely reversing the frame of which the axis of reversing movement is represented by the staff or handle; and with these objects in view the invention consists in the construction and combination of parts of which a preferred embodiment is shown in the drawing, wherein:—

Figure 1 is a view of a cultivator embodying the invention arranged in position for utilizing the cultivator or pulverizer teeth.

Figure 2 is a side view of the frame and attached parts partly broken away to show the joints and connections whereby the heads are attached, and whereby the frame is connected with the staff or handle.

Figures 3 and 4 are transverse sectional views on the planes indicated by the lines 3—3 and 4—4 of Figure 2.

Figure 5 is a detail view of one of the cultivator teeth.

Figure 6 is a similar view of an alternative plow shovel.

The device consists essentially of a staff or handle 10, preferably adapted for enabling the apparatus to be operated manually and having a terminal cross bar or grip 11 at one end and a fork 12 at the other end of which the arms are arranged to support a wheel axle or spindle 13, and rearwardly divergent forked plow beams 14 and 15 having their arms attached to the spindle or axle 13 upon which, between the planes of the arms of the handle fork and beam forks is mounted the ground or supporting wheel 16, and rearwardly convergent braces 17 extending from the plow beams to the staff or handle and combining with said plow beams to form a reversible frame of which the axis is represented by the staff or handle. The plow beams are disposed in rearward divergent relation respectively with the staff or handle and approximately at corresponding angles thereto and the forward extremities of the braces are provided with sleeves 18 disposed between the sides or arms of the beam forks near their outer, preferably looped ends, and secured by transverse bolts 19, so that said sleeves constitute spacing elements for adding to the rigidity of the plow beams. At their rear or inner ends the braces are provided with sleeves 20 located between clamp plates 21 and engaged by transverse bolts 22 arranged at opposite sides of the plane of the staff or handle and serving by drawing said plates together to clamp the staff or handle and anchor both the braces and the beams in a fixed relation thereto. Obviously by loosening the bolts 22 and moving the clamp in one direction or the other with relation to the staff or handle the angular relation of the plow beams with reference to each other and with reference to the staff or handle may be modified to enable the operator to suit the inclination of the handle or staff to his heighth or the direction in which he desires to apply pressure thereto when either of the cultivating elements is in operative position. This adjustment obviously is possible by reason of the pivot connections of the terminals of the braces respectively with the plow beams and the clamp by which adjustable engagement is made with the staff or handle.

The plow shovel carried by the beam 14 which is turned down to form a standard, obviously may be of any preferred type, that which is shown in Figure 1 at 14ª being of the weeder form, and is secured in place by a bolt 23. An earth turning shovel may be substituted therefor as will be understood by reference to Figure 6.

The cultivator head indicated at 24 consists of an assembly plate 25 having an upturned rear edge forming a lip 26 through which the shanks of the teeth 27 extend, said lip being provided with suitable openings for that purpose, and at its forward edge the plate is provided with a return bend or bead 28 in the upper and lower sides of which are formed registering openings 29 for the reception of the downturned terminal studs 30 of said tooth shanks. The portions of the shanks spanning the assembly plate are engaged by a transverse locking bar 31 held in place by bolts 32, and the head including said assembly plate and locking bar is secured to the looped end of the plow beam 15 by means of the vertical bolts 33.

From the foregoing description it will be obvious that either of the cultivating heads may be brought into operative position merely by a reversal or turning movement of the apparatus upon the staff or handle as the axis, to the end that either the plow or weeder element carried by the beam 14 or the harrow or cultivator carried by the beam 15 may be arranged in position to operate upon the soil, the supporting wheel 16 performing a common function with reference to the heads in either position of the frame.

Having described the invention, what I claim as new and useful is:—

1. A cultivator having a harrowing element consisting of teeth, an assembly plate having at its rear edge an upturned lip provided with openings for the shanks of said teeth and at its forward edge with a rolled or bent portion having registering openings for the reception of terminal angularly disposed studs on the shanks of the teeth, and means for engaging the assembled plate with the cultivator whereby the teeth are maintained in their respective positions.

2. A cultivator having a harrowing element consisting of teeth, an assembly plate having at its rear edge an upturned lip provided with openings for the shanks of said teeth and at its forward edge with a rolled or bent portion having registering openings for the reception of terminal angularly disposed studs on the shanks of the teeth, a locking plate spanning the shanks between said lip and bit, bolts passing through the assembly plate and through the locking plate to maintain the teeth in their proper position, and means for connecting the assembly plate to the cultivator.

In testimony whereof I affix my signature.

JOSEPH E. DITTEMORE.